UNITED STATES PATENT OFFICE.

JAKOB SCHMID AND KARL JEDLIČKA, OF BASLE, SWITZERLAND, ASSIGNORS TO THE SOCIETY OF CHEMICAL INDUSTRY IN BASLE, OF SAME PLACE.

ORANGE DYE.

SPECIFICATION forming part of Letters Patent No. 537,723, dated April 16, 1895.

Application filed November 27, 1894. Serial No. 530,180. (Specimens.)

*To all whom it may concern:*

Be it known that we, JAKOB SCHMID and KARL JEDLIČKA, citizens of Switzerland, residing at Basle, Switzerland, have invented new and useful Improvements in the Production of an Orange Coloring-Matter or Dye-Stuff, of which the following is a specification.

Our present invention relates to the production of new coloring matters similar to "phosphin" of the acridin series, obtained by alkylation of the yellow dye-stuffs generally known under the name of "acridine yellow" and "benzoflavin," which result from the condensation of two molecular proportions of meta toluylenediamin with the necessary quantity of glycerin and oxalic acid or from the condensation of two molecular proprotions of meta toluylenediamin with one molecular proportion of formaldehyde or benzoldehyde and by elimination of ammonia and oxidation of the thus formed intermediate products. According to the degree of alkalization, the resulting new coloring-matters produce orange-yellow to red-orange tints and are suitable for dyeing leather and cotton mordanted with tannin, or other vegetable fibers. They may be employed instead of "chrysanilin" or similar dye-stuffs.

The following are some examples showing how the alkalization may be effected, but the proportions of the agents, as well as the temperature, may be varied without injuring the result.

In carrying out our invention we proceed for instance as follows:

*First example.*—Ten kilos of acridin yellow, twenty kilos of methyl alcohol, five kilos of hydrochloric acid, are heated at from 180° to 190° centigrade in a closed enameled vessel from three to four hours. After cooling, the excess of alcohol is distilled off and the residue is dissolved in water and filtered. The hydrochlorate of the dye-stuff is separated out from the solution by evaporation. If the solution is precipitated with chloride of zinc and common salt, the coloring matter results in the form of its double salt of zinc.

*Second example.*—Four kilos of benzoflavin, three kilos of methyl alcohol, ten kilos of concentrated sulphuric acid, are heated in an enameled vessel at from 160° to 200° centigrade for four hours. The mass resulting from the reaction is diluted with water. From this solution the base of the coloring-matter is precipitated with carbonate of soda or soda-lye in the form of brownish flakes, filtered, washed and redissolved in three kilos of dilute hydrochloric acid. The dye-stuff is separated with common salt, filtered and pressed.

The thus obtained coloring-matters form red-brown powders with a green metallic luster. They dissolve easily in water with an orange-yellow coloration, showing a yellow-green fluorescence. The aqueous solutions do not coagulate in the cold. Upon addition of alkalies the base of the dye-stuffs will be precipitated in the form of brownish-yellow flakes.

The new coloring-matters are difficultly soluble in alcohol and insoluble in ether and benzene and produce orange tints on leather and cotton mordanted with tannin or on other vegetable fibers.

If in the above mentioned examples instead of acridin yellow, benzoflavin is used or of sulphuric acid is substituted for hydrochloric acid, or if in place of a mixture of alcohol and mineral acids, alkylhalogens or alkyl sulphonates are employed, similar dye-stuffs may be obtained.

Having now described our invention, what we claim as new, and desire to secure by Letters Patent, is—

1. The process of producing orange coloring matters similar to phosphin which process consists in exposing a yellow acridin dyestuff to the action of an alcohol in the presence of a mineral acid substantially as described.

2. As a new article of manufacture the orange coloring matters which can be obtained by the action of an alcohol and a mineral acid on a yellow acridin dyestuff and appear in the form of red-brown powders with a green metallic fluorescence, easily soluble in water with an orange-yellow coloration and a yellow-green fluorescence, difficultly soluble in alcohol and insoluble in ether and benzene substantially as described.

In testimony whereof we have hereunto set our hands in the presence of two subscribing witnesses.

JAKOB SCHMID.
KARL JEDLIČKA.

Witnesses:
GEORGE GIFFORD,
FALCONER E. CROWE.